United States Patent Office 3,042,846
Patented July 3, 1962

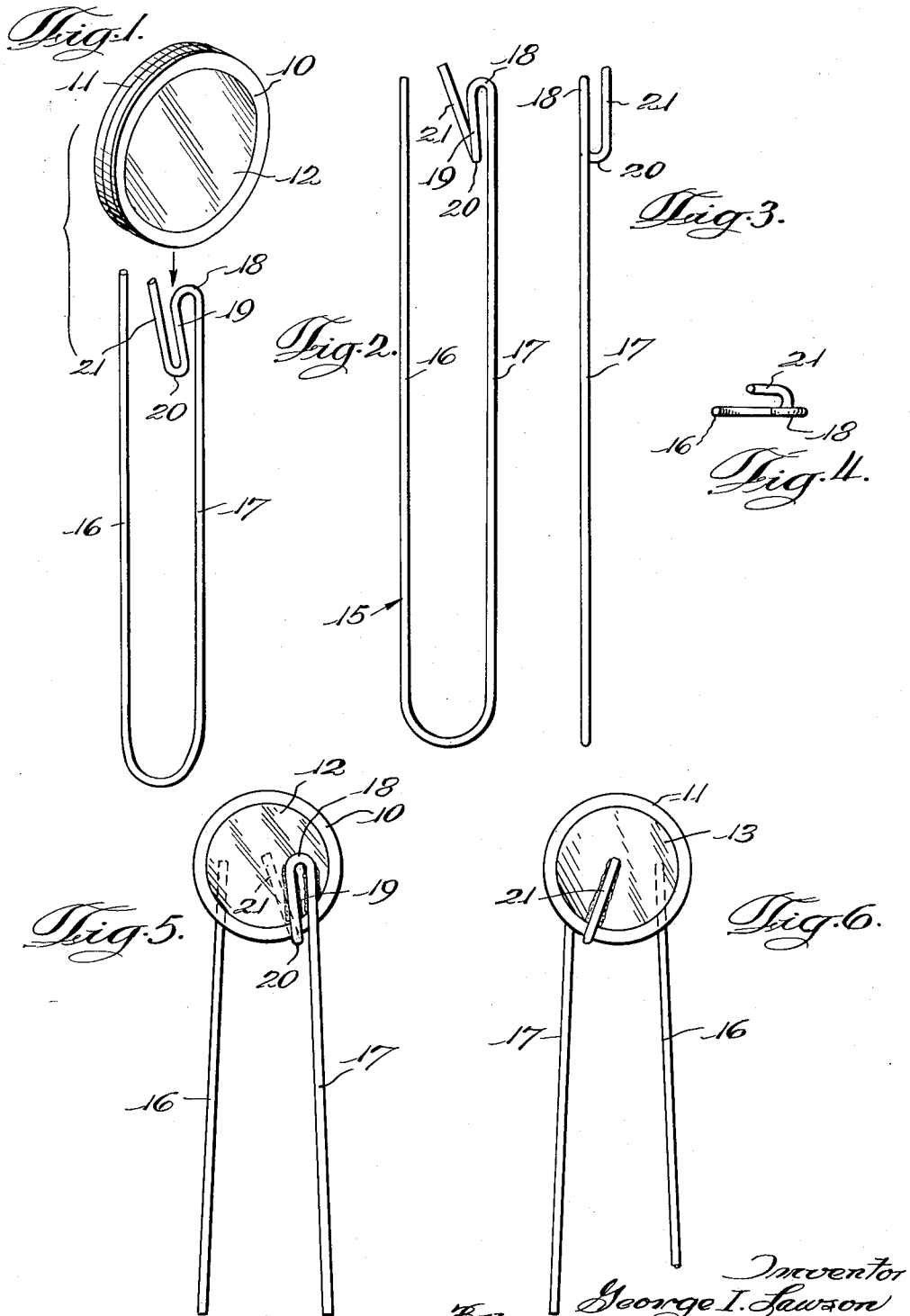

3,042,846
DUAL CAPACITOR TERMINAL
George I. Lawson, Veedersburg, Ind., assignor to P. R. Mallory & Co., Inc., a corporation of Delaware
Filed May 29, 1959, Ser. No. 816,857
3 Claims. (Cl. 317—256)

This invention relates to a capacitor and more particularly to a terminal construction for a dual ceramic capacitor.

A form of capacitor in wide use today comprises a thin element of ceramic dielectric material and generally round in shape, although the shape is not of great importance and may be square, rectangular or the like. Opposite surfaces of the ceramic element, which are generally flat and parallel, are silvered and form the plates of the capacitor and terminal connection areas. Terminals are soldered to the silvered surfaces and the entire assembly coated with an insulating material. Dual capacitors utilize two ceramic elements in a stacked arrangement with the common terminal connected between them and a pair of terminals connected with the outer surfaces. For some purposes the outer terminals are connected together and the capacitors are electrically connected in parallel.

A principal object of this invention is the provision of an improved dual capacitor and terminal construction which facilitates assembly and manufacture thereof.

One feature of the invention is the provision in a dual capacitor of a pair of disc elements of dielectric material and a terminal having an end formed in a clip configuration with the clip end engaging the elements holding them together. Another feature is that the terminal has an end with a U-shaped clip configuration and the legs of the U engage the disc holding them together.

A further feature is the provision of a single terminal means for a dual capacitor comprising a length of conductor of generally hairpin shape, one end extending between the disc elements and the other having a clip configuration engaging the discs and holding them together.

Further features and advantages will readily be apparent from the following specification and from the drawings, in which:

FIGURE 1 is an exploded view of the elements of a capacitor embodying the invention;
FIGURE 2 is an elevation of the capacitor terminal;
FIGURE 3 is a side view of the terminal looking from the left of FIGURE 2;
FIGURE 4 is a top view of the terminal;
FIGURE 5 is an elevation of an assembled capacitor; and
FIGURE 6 is a view similar to FIGURE 5 taken from the rear.

The capacitor embodying the invention and illustrated in the drawings includes a pair of discs of ceramic dielectric material 10 and 11 of generally circular shape. Of course, the shape has little or no effect on the characteristics or operation of the capacitor and may be varied as desired. As used herein, the term "disc" refers to the ceramic dielectric element whether it is round or has some other shape. The faces of the discs 10 and 11 are flat and generally parallel and each face is provided with a suitable conductive capacitor and terminal area, as 12 and 13 on the outer surfaces of discs 10 and 11, respectively. Similar areas are provided on the inner faces.

The terminal element for the dual capacitor, indicated generally at 15, comprises a length of wire formed in generally hairpin shape with legs 16 and 17. The end portion of the leg 17 is bent back upon itself at 18 with portion 19 extending generally parallel with leg 17. A second bend 20 joins portion 21 with portion 19 in a U-shaped clip configuration. Portion 21 forms one leg and portion 19 together with the end of hairpin leg 17 the other leg of a U-shaped clip. Leg 21 extends from bend 20 toward hairpin leg 16 at an angle of the order of twenty degrees.

The capacitor is assembled by inserting straight hairpin leg 16 between the ceramic dielectric discs 10 and 11 where it contacts the capacitor areas on the inner faces of the discs. The U-shaped clip is slipped over the outer surfaces of the discs with leg 19 engaging one capacitor surface and leg 21 the other. The clip terminal holds the parts together during subsequent processing.

The entire assembly is dip soldered securing the terminals mechanically and electrically to the capacitor and terminal areas on the discs. The looped end of the hairpin is cut as indicated in FIGURE 5 providing the two terminals for the capacitor. The capacitor itself may be coated with a suitable insulating material (not shown).

While I have shown and described certain embodiments of my invention, it is to be understood that it is capable of many modifications. Changes therefore, in the construction and arrangement may be made without departing from the spirit and scope of the invention as disclosed in the appended calims.

I claim:
1. In a dual capacitor: a pair of stacked disc elements of dielectric material having a conductive area on the surfaces thereof; and terminal means comprising a single length of conductor in generally hairpin shape, one end extending between and making contact with the conductive areas on inner surfaces of said disc elements and the other having a clip configuration, said clip end engaging opposed conductive areas on outer surfaces of said discs holding them together, whereby shearing a looped end of the hairpin shaped conductor provides a pair of terminals for said capacitor.

2. A terminal for a capacitor, comprising: terminal means comprising a single length of conductor in generally hairpin shape, one end extending between surfaces of stacked multiple capacitor disc elements and the other being formed in a clip configuration, said clip end engaging opposing surfaces of multiple capacitor discs holding them together, whereby shearing the looped end of the hairpin shaped conductor provides a pair of terminals for the capacitor.

3. In a dual capacitor: a pair of stacked disc elements of dielectric material having conductive areas on the surfaces thereof; terminal means comprising a single length of conductive material bent into a generally hairpin shape, one end extending between and making contact with the conductive areas on inner surfaces of said disc elements, and the other end bent back upon itself and ending in a U-clip configuration wherein one of the legs of the U extends at an angle with respect to the other leg, the legs of the clip each engaging opposed conductive areas on the outer surfaces of said discs holding them together, whereby shearing the conductor at the hairpin bend provides a pair of terminals for the dual capacitor.

References Cited in the file of this patent
UNITED STATES PATENTS

| | | |
|---|---|---|
| 1,526,664 | Dubilier | Feb. 17, 1925 |
| 2,133,086 | Dubilier | Oct. 11, 1938 |
| 2,321,071 | Ehrhardt | June 8, 1943 |
| 2,508,232 | Dewey | May 16, 1950 |
| 2,935,669 | Abeel et al. | May 3, 1960 |

FOREIGN PATENTS

| | | |
|---|---|---|
| 131,345 | Australia | Sept. 12, 1945 |